Patented Oct. 3, 1950

2,524,333

UNITED STATES PATENT OFFICE 2,524,333

MERINGUES AND METHOD OF MAKING THE SAME

John Alexander Snelling, Sale, England, assignor to The Procter & Gamble Company, Ivorydale, Ohio, a corporation of Ohio No Drawing. Application November 18, 1948, Serial No. 60,821. In Great Britain November 27, 1947

12 Claims. (Cl. 99—139)

This invention is concerned with improvements in and relating to the manufacture of "meringues" and to "meringue powders," i. e. dry mixes of materials which upon addition of suitable amounts of water may be whisked or beaten into very light foam-like masses.

The term "meringue" has hitherto been applied to confectionery produced by beating or whisking a mixture of egg whites and sugar until a very light, foam-like mass is obtained which is then, after suitable shaping if desired, baked. The baking is generally carried out at a temperature of about 280–300° F. for a period of about an hour, the actual time depending on the size of the article.

In describing and claiming the present invention the term "meringue" is used in a broad sense. It includes not only individual articles of confectionery, but also whipped, foam-like top dressing for sweet baked goods, cooked and uncooked desserts, confections, and the like; also it includes unbaked as well as baked foam-like masses for the aforesaid purposes. The meringues of the present invention may, if desired, be tinted or colored, and they are usually sweetened or otherwise flavored.

One of the objects of the present invention is to provide a new and improved process whereby meringues of a quality equal to or better than that of the usual egg meringues may be produced without the use of egg-whites or egg albumen.

Another object is to provide a convenient concentrated mixture of essential ingredients of my new meringues—either including or not including some sugar—suitable for marketing in packaged form to the baker or housewife.

I have found that reconstituted skimmed milk powder, preferably spray dried, when admixed with small quantities of one or more suitable salts and one or more suitable acids, both as herein defined can be whisked or beaten to a stiff foam-like mass, which, on addition of sugar, or other flavoring, and after any suitable shaping if desired, may be baked so as to yield meringues of excellent quality. For some purposes the baking may advantageously be omitted, the uncooked foam-like mass having desirable properties when suitably flavored.

One aspect of the invention provides what I term a "meringue powder," which does not contain egg whites or egg albumen, and which requires only the addition of a stated proportion of water to enable it to be whisked or beaten to a foam-like mass. Sugar may be incorporated, and after any desired shaping the mass may be baked to form an excellent meringue representing an important and useful addition to the bakery art.

I prepare a meringue powder by mixing finely divided milk powder with a small quantity, usually not less than 1 per cent and not exceeding 9 per cent by weight (calculated on the total weight of the dried milk, salt, and acid in the meringue powder) of one or more suitable salts as herein defined and with such a quantity of one or more suitable acids as herein defined as to adjust the pH of the wet mix resulting when the meringue powder is mixed with from 3–10 parts by weight of water to each part by weight of milk powder in the mixture to a figure below 7.0 but not less than 5.0.

The term "suitable salts" as used herein means ncn-injurious salts which are strong electrolytes, including those which are non-hydrolyzable and which form substantially neutral solutions in water. Examples of suitable salts are magnesium sulfate, calcium sulfate, sodium sulfate, potassium sulfate and sodium chloride, in general the sulfates and chlorides of sodium, potassium, calcium, and magnesium.

The term "suitable acid" as used herein means acid substances which are solid at ordinary temperatures and are in powdered form and which are non-injurious in the quantities used, and it includes inorganic acid salts and organic acids and acid salts. Examples of suitable acids are tartaric acid, citric acid, cream of tartar and acid calcium phosphate.

I may use any dried milk powder, provided that it is substantially free from fat and is finely divided. I prefer to use spray-dried skimmed milk powder.

According to a further feature of the invention I may add any desired powdered flavoring and/or edible coloring matter to the mixture.

The improved meringue powder prepared according to the present invention may be used for the preparation of baked meringues in the following manner:

From 3–10 parts by weight (preferably about 7 parts) of water to 1 part of milk powder in the mixture are added to the powder which is then whisked or beaten to a stiff foam-like mass.

The sugar is usually added to the mix after whisking, and this may be done by blending or "folding in" by normal confectionery technique, or otherwise added to the foam-like mass. The amount of sugar used may, within limits, be varied according to taste, but it should lie within the range of from 1 to 4 parts by weight of sugar to 1 part of water, that is, between one and four pounds sugar for each pint of water used.

After the foam-like mass with the sugar has been prepared it may be formed into any desired shapes, which may be accomplished in any convenient way or by normal meringue bakery technique.

The shaped portion or portions of sugared foam mass is or are then baked and we have found that instead of baking at 280 to 300° F. for 1 hour, which is normal procedure for making meringues, it is preferable to bake at a temperature of from 230 to 260° F. for from 1¼ to 1½ hours. The optimum time of baking will, of course, depend on the size of the article, but it will, in general, be found to be longer than in the case of meringues made from egg whites.

In order that the invention may be well understood, the following is given as one example of a preferred composition for a meringue powder according to the invention, and particulars of how such a powder may be used are also given:

32 parts by weight of spray dried skimmed milk powder are intimately mixed with 1 part of magnesium sulfate crystals and 1 part of tartaric acid.

In order to prepare meringues from this powder 224 parts by weight of water are added to the mixed powder, and the whole is whisked to a stiff foam-like mass in a vertical Hobart type machine (a mixer having a rotating agitator whose shaft moves around within the bowl) for approximately 15 minutes on a fast speed, in the neighborhood of 200 R. P. M.

448 parts of sugar are then folded into the foam-like mass which is then piped with a savoy bag and baked for from 1¼ to 1½ hours at a temperature of about 250° F. leaving the oven door open or partly open.

For some purposes a wet paste or wet concentrate containing the dried milk, neutral salt, and acidic substance—suitable for packaging and distributing in jars, bottles, or drums—may be preferred to a dry powdered mixture comprising these materials.

When making meringues according to the invention it is of course not necessary to start with a pre-mixed composition containing the milk, salt, and acid. One may start with reconstituted milk powder, or a mixture of milk powder and water, or with natural skimmed milk with milk powder added, whisking or beating this aqueous mixture together with added neutral salt and acid material. Any desired flavoring and edible coloring may be added at any stage; and one may also add small quantities of ground almonds, flour, and the like for the purpose of making biscuit-like confectionery.

The addition of the neutral salt has been found to speed up the formation of the foam structure and to produce a bolder and more stable finished product. A quantity of salt amounting to about 0.15 per cent of the unbaked meringue has been found to be particularly effective, and more than 0.50 per cent is to be avoided.

The addition of the acidic substance appears to improve the color of the meringue and to produce a superior internal structure.

Having thus described my invention, what I claim and desire to secure by Letters Patent is:

1. A meringue powder comprising essentially a mixture of: finely divided milk powder, a substantial quantity, but not exceeding 9 per cent of the total weight of the meringue powder, of a non-injurious strongly electrolytic substantially neutral salt chosen from the group consisting of alkali and alkaline earth metal sulfates and chlorides and mixtures thereof, and a non-injurious acidic substance in finely divided solid form, in amount sufficient to produce a pH value below 7 but not less than 5 in a wet mixture obtained by mixing water with the meringue powder in the proportion of 3 to 10 parts by weight of water to each part by weight of milk powder in the meringue powder.

2. The product of claim 1 wherein the salt is magnesium sulfate.

3. The product of claim 1 wherein the solid non-injurious acidic substance is chosen from the group consisting of inorganic acid salts, organic acids, and organic acid salts.

4. The product of claim 1 wherein the milk powder is spray dried skimmed milk powder.

5. A dry finely divided mixture of about 32 parts by weight of milk powder, about 1 part by weight of magnesium sulfate, and about 1 part by weight of tartaric acid.

6. A mixture for the purpose described, comprising about 32 parts by weight of milk powder, about 1 part by weight of magnesium sulfate, and about 1 part by weight of tartaric acid.

7. A composition suitable for the making of meringues, comprising dried milk, a non-injurious strongly electrolytic substantially neutral salt chosen from the group consisting of alkali and alkaline earth metal sulfates and chlorides and mixtures thereof, and a non-injurious solid acidic substance in amount sufficient to produce a pH value below 7 but not less than 5 in a wet mixture containing 3 to 10 parts by weight of water for each part by weight of dried milk, the amount of said non-injurious neutral salt being not less than 1 per cent nor more than 9 per cent of the sum of the weights of the dried milk, the neutral salt, and the acidic substance in the composition.

8. A method of making a meringue powder which comprises mixing together: finely divided milk powder; and a substantial quantity, but not exceeding 9 per cent of the total weight of the meringue powder, of a non-injurious strongly electrolytic substantially neutral salt chosen from the group consisting of alkali and alkaline earth metal sulfates and chlorides and mixtures thereof; and adding thereto a non-injurious acidic substance in finely divided solid form in an amount to produce a pH value below 7 but not less than 5 in a wet mixture obtained by mixing water with the meringue powder in the proportion of 3 to 10 parts by weight of water to each part by weight of milk powder in the meringue powder.

9. A method of making meringues and the like which comprises mixing finely divided milk powder with a small quantity of a non-injurious strongly electrolytic neutral salt chosen from the group consisting of alkali and alkaline earth metal sulfates and chlorides and mixtures thereof, and a small quantity of a non-injurious acidic substance in finely divided solid form, adding water to said mixture, beating said mixture to a foam-like mass, and adding sugar to said mass.

10. The process of claim 9 including the added step of baking said mass at a temperature between 230° F. and 260° F. for from 1¼ to 1½ hours.

11. The method of claim 10, including the step of keeping the oven door at least partly open during the baking step.

12. A meringue comprising essentially a baked, beaten mass constituted of a mixture of finely divided milk powder, a small quantity of a non-injurious strongly electrolytic neutral salt chosen from the group consisting of alkali and alkaline earth metal sulfates and chlorides and mixtures thereof, a small quantity of a non-injurious acidic substance in finely divided solid form, and water with sugar added.

JOHN ALEXANDER SNELLING.

REFERENCES CITED

The following references are of record in the file of this patent:

UNITED STATES PATENTS

| Number | Name | Date |
|---|---|---|
| 2,271,654 | Littlefield | Feb. 3, 1942 |
| 2,341,425 | Curry | Feb. 8, 1944 |

FOREIGN PATENTS

| Number | Country | Date |
|---|---|---|
| 16,336 | Great Britain | 1912 |